Patented Apr. 19, 1932

1,854,940

UNITED STATES PATENT OFFICE

HANS JORDAN, OF BERLIN-STEGLITZ, GERMANY, ASSIGNOR TO THE FIRM: SCHERING-KAHLBAUM AKTIENGESELLSCHAFT, OF BERLIN, GERMANY

MANUFACTURE OF CONDENSATION PRODUCTS OF ALKYL-PHENOLS AND KETONES

No Drawing. Application filed June 20, 1927, Serial No. 200,289, and in Germany June 29, 1926.

My invention refers to the production, by reacting between alkyl-phenols and ketones, of chemical products having particularly valuable properties, as starting materials for the manufacture of odorants and disinfectants such as menthol and thymol.

As is well known, ketones and phenols can be made to react with each other in such manner as to yield dioxy-diphenyl-methane compounds. It has, however, been ascertained by former investigators that this reaction is not general. While any ketone can be used, the number of phenols capable of such reaction is limited. According to Dianin (Berichte 25, Referate page 334) cresols and thymol do not react with ketones at all, and the reaction between naphthol and ketones differs from the one here considered. Unverzagt (Ueber die Einwirkung von Brom auf Di- p-oxytoly-dimethylmethan, Dissertation Marburg 1904) found that o-cresol reacts with acetone to form the normal condensation product. Gaebel (Ueber Kondensationsprodukte aus m-Kresol und p-Kresol mit Aceton, Dissertation Marburg 1903) found that m- and p-cresols react with acetone in an entirely different manner, peculiar compounds being obtained, the constitution of which is said to be

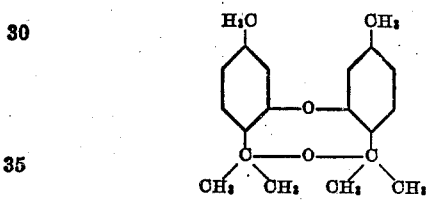

Contrary to what could be expected I have now ascertained that by suitably selecting the conditions under which the operation is carried through, I can obtain from m- and p-cresol, and further from crude cresol (cresolum crudum), which is a mixture of m- and p-cresols, products of an altogether different kind and having very valuable properties. Unlike Gaebel's products, the new products, although having the same empirical composition as Gaebel's, do not have the characteristics of ethers but contain acylizable hydroxyl groups. For instance, if prepared from crude cresol and acetone, the new products probably correspond structurally to the formula

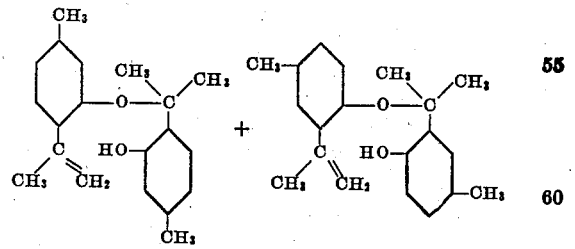

These products are light-colored substances having high refracting power and distilling in vacuo without decomposition. The boiling point of the product obtained from m-cresol and acetone at a pressure of 0,8 mm. mercury is about 187° C., and that of the product obtained from p-cresol and acetone, about 192° C. The acetyl derivative of the m-cresol compound melts at 122–123° C., and that of the p-cresol compound at 151–152°. When crude cresol is used, a mixture of these substances is obtained, which cannot be separated into their constituents by distillation.

Example 1

6 parts m-cresol and 1 part acetone are saturated in the cold with gaseous hydrochloric acid, and the mixture is then left standing in a closed vessel for 48 hours at a temperature of 30–40° C. After this time the excess of cresol is expelled with steam and the residue is subjected to distillation in vacuo. There distils over a light-colored, highly refractive liquid boiling at 187° C. under a pressure of 0,8 mm. mercury and solidifying in the cold after the manner of a resin. The liquid has the constitution $C_{20}H_{24}O_2$, its acetyl compound melts at 122–123° C.

Example 2

6 parts p-cresol and 1 part acetone are treated as described in Example 1. There is obtained a liquid boiling at 192° C. and resembling much the product obtained from m-cresol and acetone, having the same empirical constitution, and its acetyl derivatives melting at 151–152° C.

Example 3

4 parts cresolum crudum (Pharm. Germ. 6th ed.) are mixed with 1 part acetone, and gaseous hydrochloric acid is introduced into the mixture until the same is saturated. After the mixture has stood for two days at slightly elevated temperature, the cresol in excess is blown off with steam or distilled over in vacuo. The residue may also be subjected to distillation in vacuo, and after having been treated in this manner forms a light-yellow, highly refractive mass which solidifies in the cold after the manner of a resin.

Example 4

6 parts m-cresol and 1 part methyl ethyl ketone are treated as described in Example 1. The product obtained is a clear transparent mass solidifying in the cold like a resin and boiling under 14 mms. mercury pressure at 239° C. It is believed to be constituted according to the formula

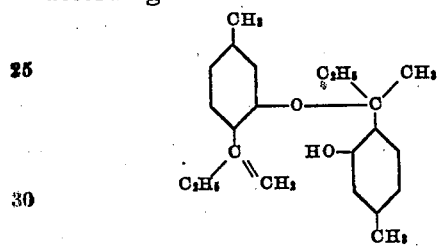

Example 5

6 parts p-cresol and 1 part methyl ethyl ketone are treated as described in Example 1. The product obtained is a clear transparent mass solidifying in the cold like a resin and boiling under 13 mms. mercury pressure at 231° C. It is believed to be constituted according to the formula

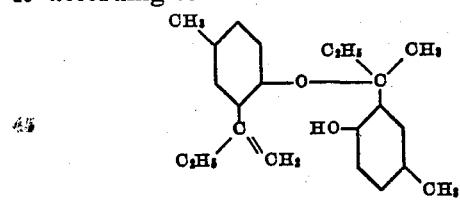

Example 6

6 parts m-cresol and 1 part cyclohexanon are treated as described in Example 1. There is obtained a product boiling under 0,8 mm. mercury pressure at 227° C. It is believed to be constituted according to the formula

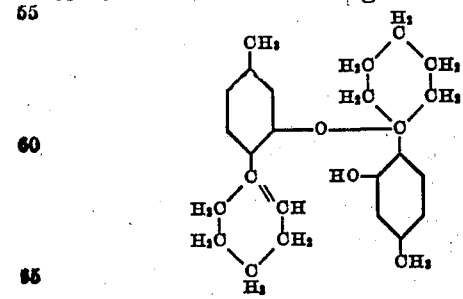

Various changes may be made in the details described in the foregoing specification without departing from the invention or sacrificing the advantages thereof.

I claim:—

1. The process of producing products of condensation from alkyl-phenols and ketones, comprising saturating a mixture of the reacting materials at ordinary temperature with gaseous hydrochloric acid, and allowing the mixture to stand at a temperature slightly above room temperature.

2. The process of producing a product of condensation from crude cresol and a ketone comprising causing condensation of the reacting materials at a temperature slightly exceeding room temperature in the presence of hydrochloric acid gas.

In testimony whereof I affix my signature.

HANS JORDAN.